April 28, 1936.  L. H. BROWNE  2,038,987
ROLL BACKSTOP
Filed Oct. 27, 1933  2 Sheets-Sheet 1
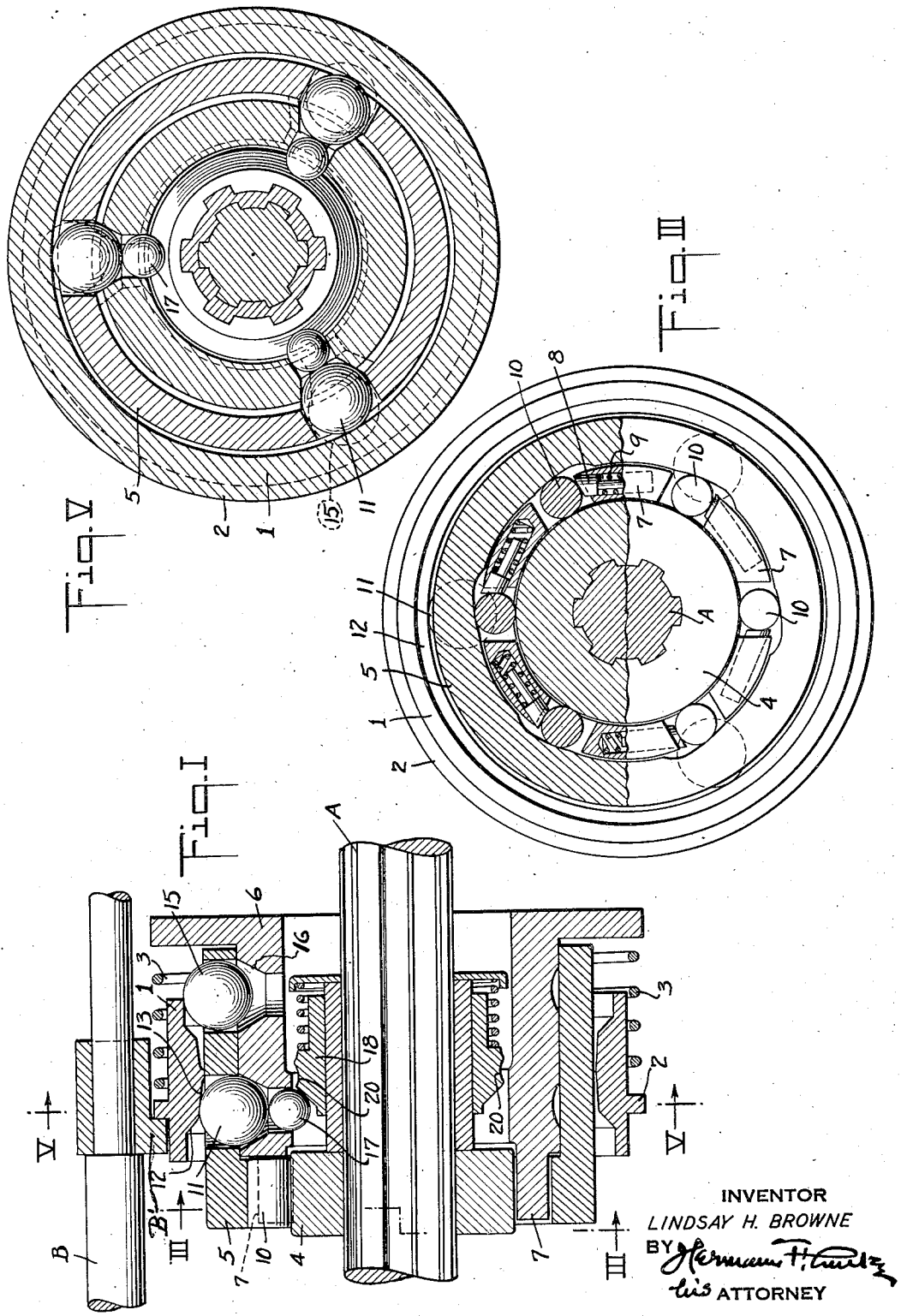
INVENTOR
LINDSAY H. BROWNE
BY
his ATTORNEY April 28, 1936.  L. H. BROWNE  2,038,987
ROLL BACKSTOP
Filed Oct. 27, 1933   2 Sheets-Sheet 2
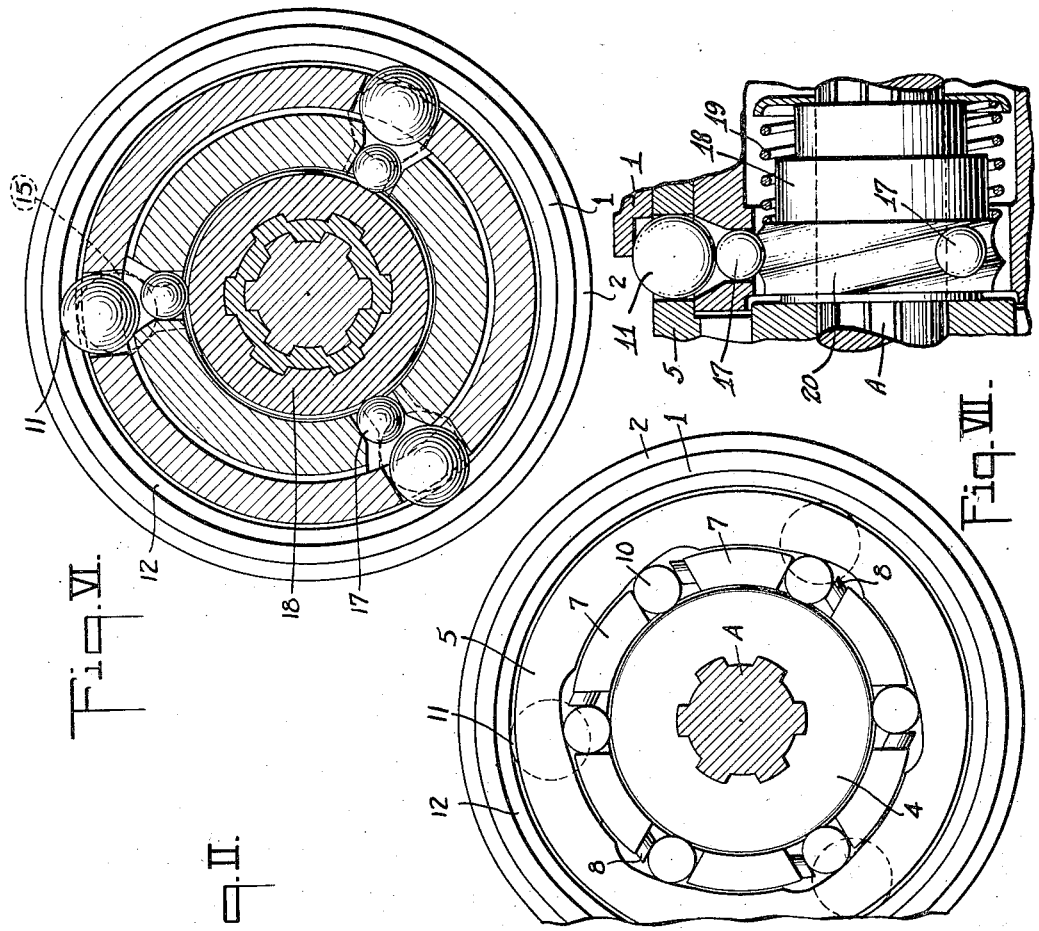
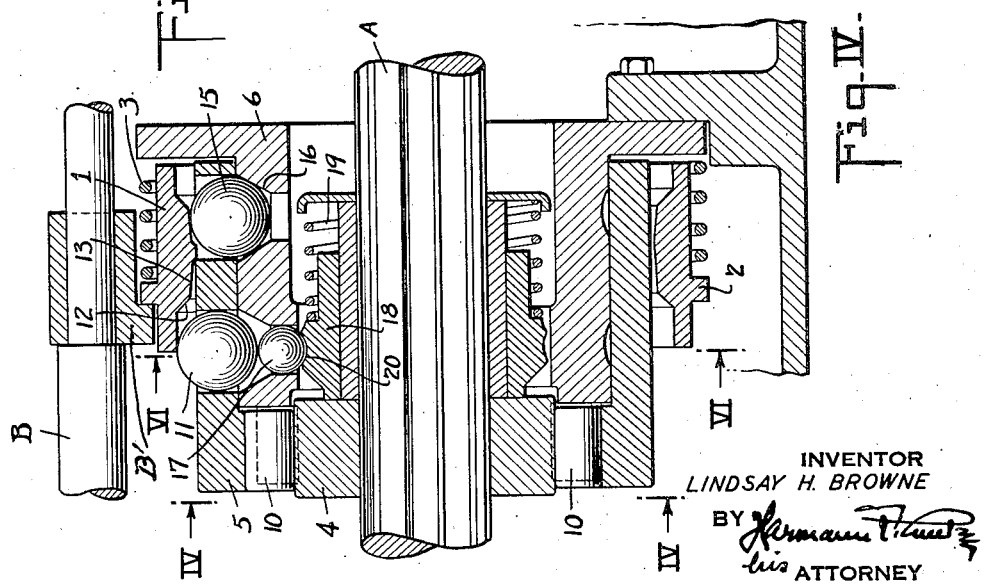
INVENTOR
LINDSAY H. BROWNE
BY
his ATTORNEY Patented Apr. 28, 1936

2,038,987

UNITED STATES PATENT OFFICE 2,038,987

ROLL BACK STOP

Lindsay H. Browne, Rochester, N. Y., assignor to Josiah Anstice & Co., Inc., Rochester, N. Y., a corporation of New York Application October 27, 1933, Serial No. 695,479

10 Claims. (Cl. 192—4)

This invention relates to the control of self-propelled vehicles, more particularly motor cars or automobiles in the operation of which the vehicle is at any time likely to be on a grade tending to roll backward. The particular purpose of the invention is to automatically prevent back rolling, that is, not requiring the judgment of the driver to voluntarily apply brakes.

Devices heretofore made have simply had the elementary functions of preventing back rolling and in some cases a variety of interlocking or interconnected features of control, while various improvements are shown in copending patent applications of this applicant, such as application Serial No. 648,899 filed January 3, 1933, and earlier applications.

The particular inventions herein relate to further improvements and developments to safeguard the proper functioning of the roll back stop.

This includes means whereby the normal functioning of the stop is made ineffective by shifting members that prevent the back rolling stop or locking, and in addition thereto means whereby setting the stop out-of-functioning position positively breaks the stop loose out-of-functioning position, and thereafter cannot by any jarring or other unusual operations which might occur on the road, be caused to shift back into locking position when the condition of operation of the vehicle makes it prohibitive for safety sake.

A further improvement involves means that automatically shift the locking means, that is, the back stopping mechanism, into functioning position when the automobile moves forward, but moves forward a predetermined definite extent before the automatic shifting into locking position can occur. It will be realized that when it is desired to intentionally drive the car backward, or permit it to roll backward, voluntary means throw the stop mechanism out-of-functioning position, and while the car continues to roll backward it is prohibitive for safety sake that by any jarring, accident or any involuntary action, the setting into functioning position should occur. Therefore the construction provides that the resumption of the functioning can only occur when the car has definitely stopped rolling backward and has actually been driven in a forward direction an appreciable extent, even though it be only sufficient to positively assure that the mass of the automobile is moving in the forward direction.

With the more detailed description herein the realization of the above objects and advantages will be apparent, as well as other advantageous features incident to the practical commercial use and foolproofness of a device of this class.

Particular embodiments of the construction are shown in the accompanying drawings, in which:

Fig. I is a longitudinal section of the parts of a back roll stop involving the invention, with the parts shown in position when the stop is functioning.

Fig. II is a similar section, with the parts in their respective positions when the roll back stop is out-of-functioning position.

Fig. III is a cross section on the line III—III of Fig. I.

Fig. IV is a cross section on the line IV—IV of Fig. II.

Fig. V is a cross section on the line V—V of Fig. I.

Fig. VI is a cross section on the line VI—VI of Fig. II.

Fig. VII is a plan or elevation of the release feed sleeve, shown in one form as 18 on the other figures.

It will be noted that the drawings show the back lock mechanism, while the structure is in fact embodied in a motor car or the like and in conjunction with a power transmission shaft or drive shaft and suitable control connections, of which only the essential elements in combination with back roll stop are herewith illustrated. The mechanism is carried in a suitable housing and may be attached to a change speed mechanism of any type, or embodied in the housing of a change speed gear, at the end of a power shaft in conjunction with the rear axle housing, or in any other desired combination.

The particular embodiment of my invention herewith illustrated involves the essential parts for one form of construction for the back roll stop mechanism, in which a transmission shaft A has the associated back stop mechanism which is controlled, as hereinafter described, by a pusher rod B for the purpose of throwing the mechanism out-of-functioning position. This pusher rod or shifter bar B is associated with the reverse gear control of the transmission mechanism in any manner that causes the effective means for shifting into reverse drive, to actuate a member such as B, which by a fork or other suitable means engages a floating ring 1, as by a collar 2, in order to shift the floating ring 1 when the reverse drive condition is set. In the form shown the floating ring is shifted against the pressure of spring 3, so that when shifting to reverse gear the floating ring is moved in one direction, and thereafter will return under the pressure of the spring 3, provided the cooperation of parts permits, as more particularly set forth in my co-pending applications such as Serial Nos. 648,533 and 649,890.

The particular improvements involved in this case relate to the control of the in-functioning and out-of-functioning of the mechanism that controls the back rolling stop parts, for the purpose of positive or certainty of action under all conditions, when it is aimed to set the mechanism for reverse drive, as well as when the normal automobile gear shifting lever is changed to neutral or any one of the forward drive positions. As one of the particular features, the object is to positively assure the release of the back roll stop, and to instantly assure the release, that is the quick breaking loose of the locking elements when it is desired to allow the automobile to coast backward or to drive it backward.

Other features of the construction will appear from the more detailed description hereinafter.

In the drawings, a cylindrical annular bearing 4 is keyed to the shaft A. An annular cam member 5 is supported on a cam-carrier 6 secured against rotation, that is anchored in any suitable manner either fixed or slightly yieldable. This cam-carrier has abutments 7 projecting between the cylindrical member 4 and the cam member 5, and these abutments carry a spring-pressed member 8 in a socket with spring 9 always tending to project the head against rollers 10, so that the predetermined pressure of the spring 9 will force the rollers 10 against the juxtaposed end of the adjacent abutment 7, provided there is no resistance due to the locking action between the rollers 10 and the cylindrical bearing 4 and the cam member 5. When the cam member 5 is moved rotarily a limited degree so that there is no back roll stop action or locking, then the rollers are pressed against the adjacent abutment in a position where they are free from locking of the cam and the cylindrical member, and therefore are out-of-functioning position. The relative movement of the cam member 5 with respect to the cam-carrier 6 and the abutments 7, is therefore controlling as to the functioning of the back roll stop.

This coordination of the mechanism is shown in my previous and co-pending patent applications, and the construction as now described is for the purpose of assuring the proper functioning of the mechanism under all conditions of practical service.

For this purpose the cam member 5 is locked with respect to the cam-carrier 6 by means of the balls 11, as shown in Fig. I, which are held in position, radially inward by the floating ring 1 which is forced over the balls with its beveled face 12 and the smaller angle beveled surface 13, so that pressure of the spring 3 holds the balls 11 in the position of locking the cam member with its cam-carrier for the in-functioning position. In the preferred form, three such balls are used, as shown, so that the floating ring 1 has a suitable engagement and centers itself on the balls and drives them with uniform pressure radially inward to their locking position.

When so set, as shown in Fig. I and Fig. V, the cam member 5 is in a position where the rollers 10 lock with the cylindrical bearing 4 and prevent back rolling. That locking will create a strain that holds the car against back rolling, and the strain will depend upon the angle of the hill or incline of the road and the mass of the car. A steep hill and a heavy car will create a severe strain, and should it then be desired to permit the car to roll back, that is float back, or for the purpose of back driving, the release of pressure on the balls 11 results in a quick breaking of the locking action of the rollers the moment the floating ring 1 is shifted, to radially release the balls 11. If, however, there is only a slight incline or a light car, or any such suitable combination, to produce the locking strain, it is desirable to have positive means to break the contact of the back roll lock and to release the car. For that purpose I provide a second series of balls 15, which cooperate with the cam member sleeve 5 and the cam-carrier 6, at a slightly different angular position compared with the balls 11, so that when the balls 15 are forced radially inward to engage the countersunk borings 16 in the cam-carrier, they force the cam sleeve a slight rotary or angular distance sufficient to positively shift the cam member with respect to the abutments 7, to the extent that positively frees the rollers 10 from their locking position. The inward radial movement of balls 15 is accomplished by the same floating ring 1, which in its opposite position forces the balls 11 into their locking position. Therefore when the floating ring 1 is shifted against the pressure of spring 3, by the operation of reverse gear shifting, the first action is to release the balls 11 so that they may move radially outward provided the strain incident to the then conditions causes them to move, but if the conditions do not instantly release the back roll stop rollers, then the further movement of floating ring 1 forces balls 15 radially inward and by their engagement with the peripherally offset counterbores 16, the cam sleeve is positively and definitely shifted so that the back roll stop is instantly thrown out-of-action or out-of-functioning.

After that has occurred the balls 11 have moved radially outward and release the pressure on balls 17, which are smaller balls pressed radially inward to engage the end of a sleeve 18, as shown in Fig. I. When balls 17 move radially outward the sleeve 18 is pressed by spring 19 and slid on the splines as shown in Fig. VI under the balls 17, which then ride on a grooved surface 20 on which the grooves spirally disposed as shown in Fig. VII engage balls 17, and positively hold the back roll stop out-of-action under all conditions, as shown in Fig. II. Thereafter there can be no resumption into functioning position of the back roll stop until the sleeve 18 has been turned a predetermined amount being rotated by its spline-engagement as shown in Fig. VI, as the shaft A rotates in its forward drive direction when there is no locking of the rollers 10, that is, rotated so as to be fed by the engagement of the spiral groove 20 in pressed contact with balls 17, against the spring action 19 a sufficient extent so that the balls 17 will drop off the end of the sleeve 18,—and then permit the radially inward forced movement of balls 11, which in turn shift the cam member with respect to the cam-carrier,—and thereby cause a resumption of in-functioning position of the back roll stop.

This sleeve 18 spring-pressed in one direction but locked against that movement until a predetermined forward movement of the car takes place, is shown in my co-pending application Serial No. 649,890 in one form, but I provide herein to control the movement by the series of balls 17 cooperating with the balls 11 and having effective spiral grooves on the outer surface of the sleeve 18, which assure definite action upon forward movement of the car, and also permit upon reverse movement of the car that the balls can over ride the spiral grooves in the surface of the sleeve 18, with the advantages of simplicity of construction, durability of wear and certainty of action.

It will be seen that in Fig. V the balls 11 are in locking position forced in by the floating ring 1, and in that condition the balls 15, there shown dotted, are in the radially outward position where they release the cam member or cam-carrier in order to permit the differential movement effected by the inward movement of balls 11. Likewise, in Fig. VI the balls 15, shown in dotted position, are behind the section of that figure, and show balls 15 in the condition where they force the cam member out-of-functioning position with respect to the cam carrier, due to the radially inward forcing of balls 15 by the floating ring 1.

In Figs. I and II, in order to avoid confusion of illustration, balls 11 and 15 and their respective carrier-holes in the cam member, and countersunk-engaging recesses in the cam carrier 6, are brought into the same section, but are in reality as illustrated in Figs. IV and V, namely, circularly or angularly slightly offset, as fully described. Also it will be understood that the countersunk recesses or the carrier-holes in the cam sleeve, for the two sets of balls 11 and 15, may be staggered around the cam carrier and cam sleeve to better preserve the strength of those members, or for any other practical reason such as in production or for assembly, durability or otherwise, but the relation of the series of holes for the balls 11 and the series of holes for balls 15 must have their slight relative rotarily angular displacement, or the two series of countersunk recesses must have the required slight peripherally angular relative displacement or offset. It will be noted that to accomplish the desired result the carrier-holes in the cam member and the engaging recesses in the cam carrier must be circularly offset to the extent of the desired angular distance in one set of balls when the holes and recesses for the other set of balls are in radial registration. Many variations may be made, or reversal of parts may be resorted to and the dimensions and angularity of engaging faces, such as the counterbore, as well as the forcing surfaces on the floating ring 1, will be a matter of definite determination for each particular design of construction, but as herein shown and described they have proven most effective and efficient in many thousands of miles of car use.

It will also be noted that the cooperation of parts to assure proper functioning involves relative pressures at contacts of balls with surfaces, so that the operation of the mechanism is not dependent upon friction of engaging flat surfaces, and in all is not dependent—nor will the functioning vary due to wear of any surfaces.

It will also be noted that the floating ring 1 requires only a balanced engagement with either one or the other series of balls, and with three balls in each series it is self-centering, and therefore may—or may not have any bearing, or in any event a loose bearing on the cam sleeve serves all practical requirements, as the floating ring must be free to move laterally under voluntary shifting when the fork B' moves the collar 2 in one direction, or when spring-pressed in the opposite direction by the spring 3. In the case of three balls in each series, which is my preferred construction, the floating ring 1 must be self-adjusting or self-centering on the three balls, so that in its support or bearing, permitting lateral displacement, it must be free against any cramping.

The operation of the apparatus will thus be understood as involving the slight rotary shifting of the cam sleeve 5 with respect to the cam-carrier 6, which carries the abutments 7 projecting between the locking rollers 10 in the raceway between the cam member 5 and the cylindrical shaft carried member 4. Such slight angular or rotary displacement causes the abutment 7 to press all the rollers into a position where they cannot lock between the cam faces and the cylindrical member 4. This slight angular movement or shifting is accomplished by the balls 11 being pressed inwardly so that they will lock the cam-carrier and cam member in a position where the abutments permit the rollers 10 to function by preventing back rotation or back-rolling of the car.

By shifting the sleeve 1 it releases the pressure on the balls 11, and in turn the sleeve 18 pressed by spring 19 drives the balls 17 radially outward and thereby disconnects, that is releases the cam member from the carrier to permit the slight rotary relative movement. As there may be some sticking of parts under certain conditions, and as it is important for perfect operation and foolproofness, to positively and instantly cause this release, the sleeve 1 has the double function when shifted to release balls 11, then in its further movement forces the balls 15 radially inward, and thereby positively shifts the cam member 5 with respect to the cam carrier 6 and the abutment. This action first releases the resistance to the pressure due to the strains of the mass of the car tending to roll back, but, furthermore, the action snaps the control members instantly out of action and completely clears the coordinated parts, and then holds them clear out-of-functioning position. This action positively frees the apparatus for back rolling, and with the pressure on balls 15 the sleeve 1 holds them in the out position so long as the balls 11 are held in their radially outward position by the small feed balls 17. Then when forward drive of the car is resumed, or forward motion, the sleeve 18 with its feed grooves 20 is retracted against the spring 19 until a sufficient turning of the shaft has fed the balls 17 off the end of sleeve 18, releasing the radial pressure against balls 11, thereby permitting the sleeve or floating ring 1 to move by pressure of spring 3 over balls 11 and force them radially inward after the floating ring has freed itself from the balls 15, which move radially outward and thereby permit the desired relative rotary movement of the cam member and cam carrier to the point of registration of balls 11 into the countersunk holes in cam carrier 6. This latter condition resets the back roll stop for functioning.

It will thus be seen that the construction herein involved assures the positive and instant throwing out-of-action of the back roll stop. Under all the varying conditions of strain, differing with the mass of the vehicle and the inclination of the road or steepness of the grade, the breaking of contact, or loosening the back lock, or snapping out-of-action is assured by the simple operation of throwing the transmission control into reverse. The reverse shifter-bar B, or its equivalent in any form of transmission may be connected by the usual standard form of gear shift lever, or any other mechanism which provides for reverse action or driving of the automobile or transmission mechanism to which this class of device is applicable. Furthermore, the supplementary ball arrangement with feed control of the locking sleeve 18, provides advantages in many ways. The single floating sleeve 1 has the double function of throwing the mechanism into functioning position and releasing it, and in addition the positive and instant shifting of the cam member into out-of-functioning position, which assures foolproofness and commercially practical operation in that respect not heretofore accomplished in the art. While I have shown a single floating sleeve or collar, and in the form illustrated have shown a particular coordination of locking balls, rollers and other parts, many variations may be made in the construction without departing from my invention, both in that respect and in various other ways, but what I claim and desire to secure by Letters Patent is:

1. In a roll back stop, an annular member having a plurality of cam faces, rollers cooperating therewith and with a cylindrical annular member, abutments adapted to engage said rollers and means of support for the annular cam member permitting a differential rotary movement with respect to the abutment carrying member, two sets of locking means cooperating with the cam member and the abutment member, one adapted to lock the cam member into functioning position and the other positively shifting the cam member to its out-of-functioning position, and a common shifting means actuating one of said locking means into position and alternately releasing the same and setting the other into locking position.

2. A roll back stop for automobiles having reverse rolling locking members adapted to be shifted into functioning or out-of-functioning relation, voluntary means for setting said members into out-of-functioning position including a member adapted for release under the back rolling strain, and coordinated means for positively cracking or snapping out-of-engagement the reverse rolling locking members and setting the reverse rolling locking members relatively into out-of-functioning position.

3. A roll back stop having cooperating rolling members between an annular cylindrical member and an annular cam member, a stationary cam carrier member for the support of said cam member having abutments cooperating with the cam member to hold the rolling members into out-of-locking position, an axially disposed transmission shaft, a sleeve mounted to turn with and move axially on said shaft having a spiral groove, a ball mounted in a guideway on the stationary cam-carrying member engaging said groove on the sleeve, and a plurality of locking balls cooperating with the cam member and the cam-carrier member for relatively shifting the cam member held in controlled position by the balls engaging said sleeve, whereby a predetermined extent of rotation of the transmission shaft in one direction relative to the cam-carrier is required precedent to the shifting of the cam member rotarily on the cam-carrier.

4. A back roll stop having an annular member with a plurality of cams, a stationary cam-carrier therefor, a plurality of balls cooperating with said two members to lock the same in predetermined rotary relation, an axially disposed transmission shaft, a sleeve thereon spring-pressed in one direction and having spiral grooves, balls engaging the end of said spring-pressed sleeve and adapted to ride the grooves when the locking balls between the cam member and cam-carrier are released from locking position, and to hold said balls out-of-locking position until predetermined rotation of the sleeve and groove cause a feeding of the sleeve against the spring permitting the release of the locking balls.

5. In an automatically controlled roll back stop for automobiles, voluntarily actuated means to set mechanism for putting the stop out of functioning condition, means for instantly and automatically supplementing the action of said voluntary actuated means after its initial movement due to its voluntary actuation, means for locking the stop out of functioning position, and means to automatically release the stop to take functioning position.

6. A roll back stop for automobiles including two concentric members one having a plurality of cam faces, rolling members between said two concentric members adapted to lock said two concentric members against relative rotation in one direction, means of support for the concentric member having cam faces permitting a limited differential rotary movement thereof freely in the direction of the locking strain, means to automatically lock the cam faced concentric member into its roll-back-stop functioning position, and voluntary means of release so constructed and arranged whereby the locking strain due to the mass of the automobile will automatically free the roll-back-stop and said voluntary means on further movement will positively lock the cam faced concentric member out-of-locking position.

7. A roll-back-stop for automobiles having a cam-ring, a concentric cylindrical member and intermediate locking rollers, a support for said cam-ring permitting free differential rotary movement, abutments adapted to engage the locking rollers, means for automatically shifting the cam-ring a differential distance rotarily in one direction with respect to said abutments, voluntary means for releasing the cam-ring when under locking strain, so constructed and arranged whereby upon the release the cam-ring will freely shift under the locking strain into the out-of-functioning position, and means associated with said voluntary means for locking the cam-ring into its out-of-functioning position.

8. A back-roll-stop for automobiles as set forth in claim 7, a single setting means, two sets of radially moving members actuated whereby each is adapted to lock the cam-ring respectively into the out-of-functioning or into the functioning position, and means for voluntarily shifting said single setting member in one direction and means for automatically shifting the same in the opposite direction.

9. A back-stop for automobiles including means for positively locking the automobile against back rolling, having concentric locking members adapted by relative differential rotary shifting to set the back-stop into functioning or out-of-functioning position, voluntary means to effect the shifting in one direction by release from the locking strain of the car and thereafter automatically free from positively locking to move under the locking strain, and coordinated means for thereafter positively shifting one of said car-locking members into and out-of-functioning position, and in one position serving to lock one of said locking means in out-of-functioning position.

10. A roll back stop having two concentric members with intermediate locking rollers, a plurality of cam faces on one of said concentric members, means to positively relieve instantly all resistance of said cam faced concentric member to locking strains when functioning, said means permitting the concentric cam faced member to move freely after relief from locking strain into out-of-functioning position under reaction of the locking strain, means to voluntarily actuate said positively relieving means and by further movement to lock the concentric cam faced member into out-of-functioning position, automatic means for releasing said out-of-functioning locking means and by further automatic movement shifting said concentric cam member to resume its functioning position actuated by a predetermined movemnt of the automobile in a forward direction.

LINDSAY H. BROWNE.